United States Patent [19]

Piccolo et al.

[11] 3,936,292

[45] Feb. 3, 1976

[54] COMPOSITIONS FOR USE IN AGRICULTURE AS SOIL MODIFIERS AND THEIR METHOD OF MANUFACTURE

[75] Inventors: Luigi Piccolo; Benedetto Calcagno, both of Milan; Marcello Ghirga, Bresso (Milan); Antonio Paolinelli, Milan, all of Italy

[73] Assignee: Societa' Italiana Resine S.p.A., Milan, Italy

[22] Filed: Sept. 26, 1974

[21] Appl. No.: 509,609

[30] Foreign Application Priority Data

Sept. 26, 1973 Italy.................................. 29397/73

[52] U.S. Cl.................... 71/63; 71/64 R; 71/64 SC; 423/548; 423/632
[51] Int. Cl.$^2$. C05D 3/02; C05D 9/00; C10C 1/244; C01G 49/02
[58] Field of Search............. 71/1, 8, 25, 31, 40, 51, 71/53, 61, 63, 64 A, 64 R, 64 SC; 423/548, 632

[56] References Cited
UNITED STATES PATENTS

| | | | |
|---|---|---|---|
| 824,791 | 7/1903 | Jenkner et al. | 71/25 X |
| 1,294,526 | 2/1919 | Vis | 423/548 X |
| 2,529,874 | 11/1950 | Hoak | 423/632 X |
| 2,741,876 | 4/1956 | Paolini | 71/63 X |
| 2,795,495 | 6/1957 | Schmatloch et al. | 71/63 X |
| 2,798,802 | 7/1957 | Roy et al. | 423/548 X |
| 2,845,332 | 7/1958 | Allison et al. | 423/548 X |

*Primary Examiner*—Frank A. Spear, Jr.
*Assistant Examiner*—Ferris H. Lander
*Attorney, Agent, or Firm*—Sughrue, Rothwell, Mion, Zinn & Macpeak

[57] ABSTRACT

Compositions useful in agriculture as soil modifiers and fertilizers are prepared by contacting the waste materials, obtained in the manufacture of titanium dioxide from ilmenites by the sulphate process, and which consist essentially of ferrous sulphate, with oxides, hydroxides or carbonates of alkali metals or alkaline earth metals or ammonium carbonate, and then submitting the reaction product to oxidation to convert the ferrous hydroxide into ferric hydroxide. Ferric hydroxide is further converted to ferric sulphate by treatment with sulphuric acid.

8 Claims, No Drawings

COMPOSITIONS FOR USE IN AGRICULTURE AS SOIL MODIFIERS AND THEIR METHOD OF MANUFACTURE

BACKGROUND OF THE INVENTION

The invention relates to new compositions for use in agriculture as soil modifiers and fertilizers and their method of manufacture.

More particularly, this invention relates to new compositions suitable for use in agriculture as soil modifiers and fertilizers, obtained from the waste materials of the manufacture of titanium dioxide from ilmenites or ilmenite slags by the sulphate process, these materials consisting essentially of heptahydrated ferrous sulphate. Obtention of ferrous sulphate and titanium dioxide from ilmenites via sulphate is described in British Patent 279,786 and in an article by W. J. O'Brien in Chem.Eng.Progress 44, pages 809-14 (1948).

On account of the limited possibility of utilizing the above-mentioned waste material, and considering also its high impurity content as well as the fact that its direct disposal is the source of severe contamination which causes considerable disruptions to the natural environment due to its reducing properties, toxicity and the large quantities involved, the problem has become increasingly important to convert such waste to products which are free from the above-described drawbacks.

Obviously, the preferred course would be the conversion of the waste material obtained in the production of titanium dioxide into an advantageously usable material.

SUMMARY OF THE INVENTION

It has now been found that it is possible to easily and economically convert the ferrous sulphate, obtained as a by-product in the method of manufacturing titanium dioxide from ilmenites or ilmenite slags sulphate, into novel compositions which can be advantageously used in agriculture as soil modifiers and fertilizers.

Thus, the present invention provides a process for preparing compositions useful in agriculture as soil modifiers and fertilizers starting from the waste materials in the manufacture of titanium dioxide obtained from ilmenites or ilmenite slags by the sulphate process, these waste materials consisting essentially of heptahydrated ferrous sulphate, characterized by thoroughly contacting these waste materials in a solid phase with a compound or a mixture of compounds chosen from the group consisting of the oxides, hydroxides or carbonates of alkali metals or alkaline earth metals or of ammonium carbonate, alone or in a mixture in an ore, to thereby obtain a conversion reaction product consisting essentially of one or more alkali metal ammonium or alkaline earth metal sulphates, and ferrous hydroxide, and submitting the product to oxidation with molecular oxygen to convert the ferrous hydroxide into ferric hydroxide.

The conversion reaction is conveniently carried out at a temperature from room temperature (20°–25°C) up to a temperature at which the ferrous sulphate heptahydrate melts (approximately 64°C) until at least 90 percent of the ferrous sulphate is converted to ferrous hydroxide.

In this range of temperatures the reaction is very speedy and practically quantitative when using waste materials of a grain size up to 3 mm, preferably from 0.1 to 2 mm, and these compounds, or when employing ores having a grain size from 0.01 to 0.8 mm, preferably not exceeding 0.5 mm.

According to the preferred embodiment of the invention, the conversion reaction is carried out through a thorough dry mixing of the waste material with oxide, hydroxide or carbonate of calcium or magnesium, potassium carbonate or ammonium carbonate.

The oxidation reaction is advantageously carried out in a simple manner by treatment with oxygen or a gas containing molecular oxygen, such as air, conveniently at a temperature in the range from 20°C to a temperature not exceeding 80°C, and preferably from 20°C to 60°C, until at least 90 percent of the ferrous hydroxide is converted to ferric hydroxide.

It is not advisable to exceed the above-mentioned limits of temperature both in the conversion reaction and in the oxidation reaction, as otherwise the final composition would undergo a considerable decrease in its soil modifying properties.

The process according to the invention is economically highly convenient since it can be carried out simply with any conventional means for intermixing powders and effecting gas-solid reactions.

Thus, when the conversion reaction and oxidation reaction are carried out separately, powder mixers can simply be employed for intermixing.

Oxidation can be effected simply by exposing to ambient air the conversion reaction product arranged in a layer of a thickness sufficiently small to ensure a satisfactory mutual contact of the product and air.

However, the conversion reaction and oxidation reaction can be carried out simultaneously, and the process can be then carried out in a simple manner in a static condition in the air or by means of a tubular rotary reactor to which an air stream is fed in countercurrent fashion to the stream of solid mixture, or a fluidized bed technique can be employed.

When carrying out both conversion reaction and oxidation in a single step, the waste material, the reactant compound or mixture of compounds, alone or in mixture in the ore, and oxygen or a gas containing molecular oxygen are simultaneously contacted at a temperature from 20° to 64°C.

In order to improve the soil-modifying properties of the compositions according to the invention, the oxidation product which consists essentially of one or more alkali metal, ammonium or alkaline earth sulphates, and ferric hydroxide can be submitted to a treatment with sulphuric acid in order to partly or totally convert the ferric hydroxide into ferric sulphate.

This reaction, which is a practically quantitative one, is conveniently carried out at a temperature of 50°–60°C, which is reached in effect of the heat evolved by the reaction.

Advantageously, the oxidation product is brought to a finely subdivided form, preferably of a grain size of 0.05 to 1 mm.

The quantities of sulphuric acid are usually adjusted to effect a conversion of the ferric hydroxide amounting to 40 percent by weight at least, preferably from 80 to 95 percent by weight.

This conversion can be carried out simply by spraying highly concentrated sulphuric acid, such as commercial 98 wt. percent sulphuric acid, on the oxidation product.

The compositions according to this invention can be advantageously employed as modifiers for compact soils, more particularly the soils containing alkali metal clays, and, when they include nitrogen or potassium or both, also as fertilizers.

In the soils containing alkali metal clays, which are very frequent and hardly suitable for cultivation, the soil structure is such that the arrangement of the soil particles allows practically no circulation of air and water. Under these conditions, the vital cycle of the plants becomes difficult and at times impossible. Moreover, these soils are subject to washing away and erosion by atmospheric precipitations.

It was known in the art that the properties of compact soils, more particularly the clay-type ones, could be modified by application of ferric salts in order to make them suitable for cultivation. These salts cause the minute clay particles to agglomerate in the form of clumps, whereby the soil becomes of a porous granular structure. This structure allows considerable improvements in the soil permeability and aeration, as water and air can then easily penetrate the free spaces between the individual clumps, this being highly advantageous for cultivation.

Moreover, a porous granular structure eliminates practically quantitatively the danger of washing away and erosion of the soil.

Direct use of ferric salts in agriculture is, however, expensive, and for this reason a number of measures are usually taken in order to reduce the quantity to be used.

The compositions according to the present invention, in addition to being prepared in a very simple and inexpensive manner, are also particularly advantageous in that they can be used in widely different soils by varying their components.

More particularly, the compositions containing ammonium or potassium sulphate alone or jointly can be advantageously employed in less compact clay-type soils, above all in soils which are already cultivated and, generally, in soils which do not require over 20–30 metric quintals modifier per hectar in order to ensure a satisfactory modifying effect. In fact, the compositions containing ammonium or potassium sulphate, alone or jointly, cannot be employed beyond certain limits, inherent to each culture, and generally in quantities exceeding 20–30 metric quintals hectar, without adversely affecting the culture.

The compositions containing alkaline earth metal sulphates, more particularly those of magnesium and calcium alone or jointly, are, however, subject to no limitation in use.

For this reason the compositions can be advantageously employed in particularly compact clay-type soils which, in order to be effectively modified, require very high modifier quantities, even to the extent of 100–200 metric quintals per hectar.

Summarizing, with less compact soils the compositions containing ammonium or potassium sulphate alone or jointly can be employed, while with more compact soils the compositions containing magnesium or calcium sulphate alone or jointly are useful.

Moreover, a mixture of the compositions containing alkali metal, ammonium or alkaline earth metal sulphates can be employed, of course while complying with the conditions enumerated above.

Thus, for instance, the compositions containing ammonium or potassium sulphate can be employed also with less compact clay-type soils, provided their quantity does not exceed 20 and 30 metric quintals hectar, and they can be mixed with further quantities of compositions containing alkaline earth metal sulphates, in order to obtain a sufficient modifying effect on the soils. Obviously, even with less compact soils the compositions containing alkaline earth metal sulphates can be substituted all or in part of the compositions containing ammonium and potassium sulphate.

Further factors should be taken into account, such as the lower cost of calcium carbonate, the requirements of the cultures, the composition and requirements of the soils, these factors being beyond the scope of this invention. Finally, the compositions according to the present invention are characterized by anti-chlorosis activity. It is known that chlorosis is a plant disease resulting from insufficiency of iron. Though it has not ascertained with certainty whether iron is absorbed by plants in its bivalent or trivalent form, the general opinion is that iron is absorbed in the form of ferrous iron.

The compositions of the invention, when applied to soils containing alkali metal clays where the existing plants suffered from chlorosis, have afforded an easy remedy against this disease.

Without expressing any theory about chlorosis, since under the pH conditions of soils containing alkali metal clays the only soluble iron form which can therefore be assimilated by the plants is the bivalent one, the anti-chlorosis activity of the compositions of the application could be justified by the small quantities (about 0.1 to 2 percent by weight) of bivalent iron present in the compositions.

The compositions and process of the invention will be illustrated by the following examples which should, however, not be understood in a limiting sense.

EXAMPLE 1

200 g ferrous sulphate, obtained as by-product of the processing of ilmenite into titanium dioxide, were mixed by hand in a vertical cylindrical glass container with 67.5 g calcium carbonate of a 98.5 percent by weight concentration.

The ferrous sulphate had the following chemical composition (percentages by weight): $FeSO_4.7H_2O$ = 88.6 percent; $MgSO_4.7H_2O$ = 6.8 percent; $Al_2(SO_4)_3.18H_2O$ = 0.8 percent; $MnSO_4.5H_2O$ = 0.56 percent; $CaSO_4.2H_2O$ = 0.26 percent; $TiOSO_4$ = 0.18 percent; sulphates of chromium, vanadium, zirconium, hafnium and rare earths 0.01 percent; free sulphuric acid 0.09 percent; $H_2O$ 2.7 percent.

Moreover, the grain size distribution of the ferrous sulphate ranged essentially from 0.5 to 2 mm. The calcium carbonate was of the finely ground type, its grain size being by 80 percent less than 0.05 mm. The reactants were allowed to ripen statically in air in a layer of about 8 cm. The temperature during progress of the reaction reached 41°C as a maximum.

The conversion reactions of ferrous sulphate into calcium sulphate and ferrous hydroxide, and the oxidation of the latter into ferric hydroxide were analytically followed as a function of time and the following results were obtained:

| time period (hrs) | conversion (% by weight) | oxidation (% by weight) |
| --- | --- | --- |
| 1 | 61.8 | 30.4 |
| 3 | 72.5 | 67.3 |
| 5 | 81.0 | 70.5 |
| 24 | 99.8 | 99.3 |

The resulting product A, which was slightly aggregate, was submitted to rapid grinding to reduce the grain size to less than 0.5 mm.

By way of testing of the soil structure modifying properties of the resulting product A a percolation rate test and a determination of the distribution of the clay/silt/sand fractions was effected as compared with a sample of non-treated soil. In the following, particles smaller than 0.002 mm in diameter are defined as clay; particles between 0.002 and 0.02 mm are defined as silt; particles exceeding 0.02 mm in diameter are defined as sand.

The soil employed for testing the product was of the alkali metal clay type from Santaluce (Pisa) and its nature was as follows:

pH = 8
$Al_2O_3$ = 11.8 percent; $SiO_2$ = 39.1 percent; $Na_2O$ = 0.55 percent; $K_2O$ = 3.5 percent; $TiO_2$ = 0.8 percent; CaO = 11.4 percent; MgO = 3.2 percent; $Fe_2O_3$ = 6.1 percent;
$Co_2$ = 5.7 percent; $SO_4$ = 0.01 percent.

The percentages are by weight.

For testing the product was incorporated with the soil in a proportion of 1 percent by homogeneously distributing it therein. The resulting mixture was moistened, then allowed to ripen during 50 hours, whereupon it was disaggregated and sieved.

The product smaller than 2 mm in grain size was charged in a layer 100 mm high to a percolator 50 mm in diameter.

The percolation test was carried out at constant water head amounting to 100 mm over the soil surface. The comparative test was carried out in the same manner on the same soil, without addition of modifier, but prepared similarly to the modified soil.

As a result, the modified soil allowed percolation of 150 ml water in two hours, while the comparative non-modified soil allowed percolation of 80 ml water only.

The test for determining the clay/silt/sand fractions was effected along the S.I.S.S. (International Society for Soil Science) process.

This process effects disaggregation of the soil by treatment at boiling temperature with ammonium carbonate solutions, subsequently with a sodium hydroxide solution. The grain size of the fractions is then determined on the disaggregated soil by Andreasen's apparatus. Both S.I.S.S. process and Andreasen's apparatus are described in Soil Sci. 39, 263 (1935).

The following distribution by weight was ascertained on the modified soil sample: clay 13.4 percent; silt 58.6 percent; sand 28 percent. The non-modified comparative soil sample exhibited the following distribution by weight: clay 40 percent, silt 38 percent; sand 22 percent.

The above-mentioned product A was also sprayed, after grinding, with 86 g 98 wt. percent sulphuric acid and allowed to ripen during 24 hrs at room temperature. The conversion of ferric hydroxide into ferric sulphate amounted to about 90 percent by weight.

The resulting product B was also submitted to both percolation test and determination of the distribution of the modified soil sample under the abovementioned conditions.

The modified soil allowed percolation of 310 ml water in 2 hours.

The following distribution by weight was ascertained on the modified soil sample: clay 4 percent; silt 60 percent; sand 36 percent.

EXAMPLE 2

A steel mixer of a conventional type for compounding powders was charged with 4,000 g ferrous sulphate and 1,350 g calcium carbonate both of the same nature as in Example 1. Mixing was carried out during 30 minutes, whereupon the product was allowed to ripen in air. The temperature reached a maximum value of 40°C. After 4 hours the conversion reaction into calcium sulphate and the oxidation reaction into ferric hydroxide reached 99 percent by weight.

The resulting product was quickly ground to a grain size of less than 0.5 mm, then sprayed with 1,700 g sulphuric acid of a concentration of 98 wt. percent, and allowed to ripen during 24 hours. The conversion of ferric hydroxide into ferric sulphate amounted to over 90 percent.

The new resulting product was subjected to the tests described in Example 1 and yielded results slightly superior to those of the product B of Example 1.

EXAMPLE 3

Example 1 was repeated but 200 g ferrous sulphate were mixed with 91.9 g technical potassium carbonate of a 98 wt. percent $K_2CO_3$ concentration. The conversion reactions of ferrous sulphate into potassium sulphate and ferrous hydroxide and the oxidation of the latter into ferric hydroxide yielded the following results:

| time (hrs) | conversion (% b.w.) | Oxidation (% b.w.) |
|---|---|---|
| 1 | 38.8 | 32.4 |
| 2 | 45.5 | 41.3 |
| 4 | 93.1 | 86.0 |
| 24 | 98.2 | 97.7 |

The temperature reached 42°C approximately as a maximum. The resulting product $A_1$ was submitted to grinding to a grain size below 0.5 mm. At the percolation test effected on the same soil as in Example 1 and under the same conditions, the modified soil allowed percolation of 170 ml water in two hours against 80 ml water for the non-modified soil.

The test for determining the clay/silt/sand fractions on the modified soil yielded the following percentages by weight: clay 17 percent; silt 53.7 percent; sand 29.3 percent.

The above-mentioned product $A_1$ was sprayed, after grinding, with 86 g 98 wt. percent sulphuric acid and allowed to ripen during 24 hours. The conversion of ferric hydroxide into ferric sulphate amounted to over 90 percent.

The resulting product $B_1$ was also submitted to both percolation test and determination of the distribution of the modified soil sample under the conditions defined in Example 1.

The percolation was 324 ml water in two hours.

The distribution by weight on the modified soil sample was: clay 4 percent; silt 63 percent; sand 33 percent.

EXAMPLE 4

The Example 1 was repeated, however 200 g ferrous sulphate were mixed with 120 g magnesium hydrated carbonate ($MgCO_3 \cdot Mg(OH)_2 \cdot 3H_2O$) of the commercial type with a 97 percent by weight concentration.

The conversion reactions of ferrous sulphate into magnesium sulphate and ferrous hydroxide and the oxidation of the latter into ferric hydroxide yielded the following results:

| time period (hrs) | conversion (% b.w.) | oxidation (% b.w.) |
|---|---|---|
| 1 | 50 | 35 |
| 2 | 68.7 | 55.5 |
| 4 | 84.5 | 74.3 |
| 24 | 97.5 | 96.5 |

The temperature reached 35°C as a maximum.

The resulting product $A_2$ was submitted to grinding to a grain size of less than 0.5 mm.

The percolation test carried out on the same soil as Example 1, under the same conditions, exhibited with the modified soil a percolation of 155 ml water in two hours.

The test for determining the clay/silt/sand fractions gave with the modified soil and the following distribution by weight: clay 14.5 percent; silt 57 percent; sand 28.5 percent.

The above-mentioned product $A_2$ was sprayed, after grinding, with 86 g 98 wt. percent sulphuric acid and allowed to ripen during 24 hours. The conversion of ferric hydroxide into ferric sulphate amounted to over 90 percent.

The resulting product $B_2$ was submitted to both percolation test and determination of the distribution of the modified soil sample under the conditions defined in Example 1.

The percolation was 315 ml water in 2 hours. The distribution by weight on the modified soil sample was: clay 5 percent; silt 64 percent; sand 31 percent.

EXAMPLE 5

Example 1 was again repeated, however 200 g ferrous sulphate were mixed with 71.8 g commercial ammonium carbonate with a $NH_3$ concentration of 31.5 percent by weight.

The conversion reactions of ferrous sulphate into ammonium sulphate and ferrous hydroxide and the oxidation of the latter into ferric hydroxide yielded the following results:

| time period (hrs) | conversion (% b.w.) | oxidation (% b.w.) |
|---|---|---|
| 1 | 99.9 | 30.4 |
| 2 | 99.9 | 65.8 |
| 4 | 99.9 | 85.6 |
| 24 | 99.9 | 97.5 |

The temperature reached 50°C as a maximum.

The resulting product was submitted to grinding to a grain size of less than 0.5 mm, then sprayed with 86 g 98 wt. percent sulphuric acid and allowed to ripen during 24 hours. The conversion of ferric hydroxide into ferric sulphate amounted to over 90 percent. The percolation test effected on the same soil as Example 1 under the same conditions exhibited with the modified soil a percolation of 330 ml water in two hours.

The test for determining the fractions of clay/silt/sand exhibited with the modified soil the following values: clay 4 percent; silt 62 percent; sand 34 percent by weight.

EXAMPLE 6

Example 1 was again repeated, however mixing 200 g ferrous sulphate with 39.3 g calcium oxide of a 95 wt. percent CaO concentration.

The conversion reactions of ferrous sulphate into calcium sulphate and ferrous hydroxide and the oxidation of the latter into ferric hydroxide gave the following results:

| time period (hrs) | conversion (% b.w.) | oxidation (% b.w.) |
|---|---|---|
| 1 | 85.1 | 22.3 |
| 2 | 88.2 | 34.3 |
| 4 | 95.0 | 65.0 |
| 24 | 99.9 | 98.1 |

The temperature reached 55°C as a maximum.

The resulting product was submitted to grinding to a grain size of less than 0.5 mm then sprayed with 86 g 98 wt. percent sulphuric acid and allowed to ripen during 24 hours. The conversion of ferric hydroxide into ferric sulphate amounted to over 90 percent.

The percolation test carried out on the same soil as Example 1 under the same conditions exhibited with the modified soil a percolation of 225 ml water in 2 hours.

The test for determining the clay/silt/sand fractions exhibited with the modified soil the following results: clay 6 percent; silt 62 percent; sand 32 percent by weight.

EXAMPLE 7

Example 1 was again repeated, however mixing 200 g ferrous sulphate with 34 g 98 wt. percent calcium carbonate and 46 g 98 wt. percent commercial potassium carbonate.

The conversion reactions of ferrous sulphate into calcium sulphate, potassium sulphate and ferrous hydroxide and the oxidation of the latter into ferric hydroxide gave the following results.

| time period (hrs) | conversion (% b.w.) | oxidation (% b.w.) |
|---|---|---|
| 1 | 49.6 | 31.8 |
| 2 | 63.6 | 52.7 |
| 4 | 87.3 | 78.9 |
| 24 | 99.2 | 98.8 |

The temperature reached about 43°C as a maximum.

The resulting product was submitted to grinding to a grain size of less that 0.5 mm, then sprayed with 86 g 98 wt. percent sulphuric acid, then allowed to ripen during 24 hours. The conversion of ferric hydroxide into ferric sulphate amounted to over 90 percent. The percolation test carried out on the same soil as Example 1 under the same conditions exhibited with the modified soil a percolation of 321 ml water in two hours.

The test for determining the clay/slit/sand fractions exhibited with the modified soil the following results: clay 4 percent; slit 64 percent; sand 32 percent by weight.

EXAMPLE 8

Example 1 was again repeated, however mixing 200 g ferrous sulphate with 34 g 98.5 wt. percent calcium carbonate and 36 g commercial ammonium carbonate of a 31.5 percent $NH_3$ concentration. The conversion reactions of ferrous sulphate into calcium sulphate, ammonium sulphate and ferrous hydroxide and the oxidation of the latter into ferric hydroxide gave the following results:

| period of time (hrs) | conversion (% b.w.) | oxidation (% b.w.) |
| --- | --- | --- |
| 1 | 78.6 | 30.4 |
| 2 | 82.2 | 66.2 |
| 4 | 92.1 | 78.4 |
| 24 | 99.8 | 98.8 |

The temperature reached 45°C as a maximum.

The resulting product was submitted to grinding to a grain size of less than 0.5 mm, then sprayed with 86 g 98 wt. percent sulphuric acid and allowed to ripen during 24 hours. The conversion of ferric hydroxide into ferric sulphate amounted to over 90 percent. The percolation test carried out on the same soil as Example 1 under the same conditions exhibited with the modified soil a percolation of 322 ml water in two hours.

The test for determining the clay/slit/sand fractions exhibited with the modified soil the following results: clay 5 percent; slit 57 percent; sand 38 percent by weight.

What we claim is:

1. A method for preparing a composition useful in agriculture as a soil modifier and fertilizer starting from a waste material which is obtained in the manufacture of titanium dioxide from ilmenites or ilmenite slags by the sulphate process and consists essentially of heptahydrated ferrous sulphate, comprising the steps of thoroughly contacting by a dry mixing the waste material having a grain size up to 3 mm with a compound or a mixture of compounds chosen from the group consisting of potassium carbonate, ammonium carbonate and the oxides, hydroxides and carbonates of calcium and magnesium, said compound or mixture of compounds being alone or in mixture in an ore and said compound or said ore having a grain size from 0.01 to 0.8 mm, at a temperature of from 20°C to the melting point of the heptahydrated ferrous sulphate, thereby obtaining a conversion reaction product consisting essentially of ferrous hydroxide and at least one sulphate of the group consisting of sulphates of calcium, magnesium, potassium and ammonium, and submitting the said conversion reaction product to oxidation in the presence of oxygen or a gas containing molecular oxygen at a temperature from 20° to 80°C to convert at least 90 percent of the ferrous hydroxide into ferric hydroxide.

2. The method of claim 1, wherein the conversion reaction and the said oxidation are carried out in a single step by simultaneously contacting the waste material, the said compound or mixture of compounds, alone or in mixture in the ore, and oxygen or a gas containing molecular oxygen at a temperature from 20°C to the melting point of the said ferrous sulphate.

3. The method of claim 1, wherein the oxidation step is carried out by exposing to ambient air the said conversion reaction product arranged in a layer.

4. The method of claim 1, wherein the product obtained at the oxidation step is treated with sulphuric acid to thereby convert the ferric hydroxide into ferric sulphate in a proportion of at least 40% by weight.

5. The method of claim 2, wherein the product obtained is treated with sulphuric acid to thereby convert the ferric hydroxide into ferric sulphate in a proportion of at least 40 percent by weight.

6. The method of claim 5, wherein the ferric hydroxide is converted in a proportion from 80 to 95 percent by weight.

7. The method of claim 1 wherein the waste material is of a grain size from 0.1 to 2 mm and the said compound or said ore is of a grain size not exceeding 0.5 mm.

8. The method of claim 1 wherein the oxidation reaction temperature is from 20° to 60°C.

* * * * *